United States Patent
Kim et al.

(10) Patent No.: US 7,695,778 B2
(45) Date of Patent: Apr. 13, 2010

(54) LIQUID CRYSTAL COMPOSITION AND LIQUID CRYSTAL DISPLAY APPARATUS USING THE SAME

(75) Inventors: Hyun-Wuk Kim, Asan-si (KR); Keun-Chan Oh, Cheonan-si (KR); Jong-Ho Son, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/055,941

(22) Filed: Mar. 26, 2008

(65) Prior Publication Data
US 2008/0273160 A1    Nov. 6, 2008

(30) Foreign Application Priority Data
May 2, 2007    (KR) .................... 10-2007-0042643

(51) Int. Cl.
C09K 19/30    (2006.01)
C09K 19/12    (2006.01)
G02F 1/133    (2006.01)

(52) U.S. Cl. .............. 428/1.1; 252/299.63; 252/299.66; 349/182

(58) Field of Classification Search ............ 252/299.63, 252/299.66; 428/1.1, 1.3; 349/46, 139, 142, 349/182
See application file for complete search history.

(56) References Cited

U.S. PATENT DOCUMENTS

| | | | |
|---|---|---|---|
| 7,351,453 B2 * | 4/2008 | Ichinose et al. | ............... 428/1.1 |
| 2005/0190316 A1 * | 9/2005 | Takahashi et al. | ............. 349/44 |
| 2006/0115606 A1 * | 6/2006 | Ichinose et al. | ............... 428/1.1 |
| 2008/0308768 A1 * | 12/2008 | Klasen-Memmer et al. | ...... 252/299.61 |

FOREIGN PATENT DOCUMENTS

| | | | |
|---|---|---|---|
| JP | 08104869 A | | 4/1996 |
| JP | 2006169518 A | | 6/2006 |
| KR | 1020050085903 A | | 8/2005 |
| WO | WO 2006002952 | * | 1/2006 |

* cited by examiner

*Primary Examiner*—Shean C Wu
(74) *Attorney, Agent, or Firm*—Cantor Colburn LLP

(57) ABSTRACT

A liquid crystal composition includes a bicyclohexyl compound in an amount of about 35 percent by weight to about 50 percent by weight, a cyclohexyl phenyl compound in an amount of about 15 percent by weight to about 25 percent by weight, a bicyclohexyl phenyl compound in an amount of about 20 percent by weight to about 25 percent by weight, and a cyclohexyl biphenyl compound in an amount of about 15 percent by weight to about 20 percent by weight. The liquid crystal composition can improve the display quality and response time of a liquid crystal display (LCD) apparatus.

14 Claims, 5 Drawing Sheets

504

LIQUID CRYSTAL COMPOSITION AND LIQUID CRYSTAL DISPLAY APPARATUS USING THE SAME

This application claims priority under 35 U.S.C. §119 to Korean Patent Application No. 2007-42643, filed on May 2, 2007, and all the benefits accruing therefrom under 35 U.S.C. §119(a), the contents of which are herein incorporated by reference in their entirety.

BACKGROUND OF THE INVENTION

1. Field of the Invention

The present invention relates to a liquid crystal composition and a liquid crystal display ("LCD") apparatus having the liquid crystal composition. More particularly, the present invention relates to a liquid crystal composition used for an LCD apparatus and an LCD apparatus having the liquid crystal composition.

2. Description of the Related Art

A liquid crystal display (LCD) apparatus includes an LCD panel and a backlight assembly supplying the LCD panel with light. The LCD panel includes a first substrate, a second substrate and a liquid crystal layer. The first substrate generally includes gate lines, data lines, switching elements and pixel electrodes, formed on a surface of the first substrate. The second substrate is located opposite the first substrate and includes common electrodes. The liquid crystal layer is interposed between the opposing surfaces of the first and the second substrates so that corresponding electrical and optical contacts on each opposing surface are disposed to coincide.

When an electrical field is induced (i.e., formed) between the pixel electrodes and the common electrodes, the liquid crystal molecules of the liquid crystal layer orient so that their axes align in the same direction and with the same degree of rotation according to the strength of the field, and in this way the liquid crystal molecules in the electrical field collectively act as a variable shutter to control the transmittance of light. Accordingly, the LCD apparatus displays images.

A vertical alignment ("VA") mode, which is a type of display mode, has been developed in order to improve viewing angles. Generally, liquid crystal molecules in the VA mode have a negative dielectric anisotropy.

After the LCD display apparatus displays one image, the LCD apparatus then displays another image. This second, residual image may be displayed when the other image is displayed. The other image having the residual image is referred to as an afterimage. The afterimage may be caused by impurities entering the liquid crystal layer, and when the response time of the liquid crystal molecules is slow. Due to the afterimage, the LCD apparatus may have reduced display quality.

For example, afterimage problems may be resolved by improving the rising time and/or falling time of the liquid crystal molecules, thereby improving the response time.

However, molecules that are added to a liquid crystal composition in order to improve the response time may actually increase afterimages and reduce the reliability of the LCD apparatus.

BRIEF SUMMARY OF THE INVENTION

The present invention provides a liquid crystal composition capable of improving the display quality of a liquid crystal display (LCD) apparatus.

The present invention also provides an LCD apparatus having the above-mentioned liquid crystal composition.

In an aspect of the present invention, a liquid crystal composition includes a bicyclohexyl compound in an amount of about 35 percent by weight to about 50 percent by weight, the bicyclohexyl compound being represented by Chemical Formula 1, a cyclohexyl phenyl compound in an amount of about 15 percent by weight to about 25 percent by weight, the cyclohexyl phenyl compound being represented by Chemical Formula 2, a bicyclohexyl phenyl compound in an amount of about 20 percent by weight to about 25 percent by weight, the bicyclohexyl phenyl compound being represented by Chemical Formula 3, and a cyclohexyl biphenyl compound in an amount of about 15 percent by weight to about 20 percent by weight, the cyclohexyl biphenyl compound being represented by Chemical Formula 4.

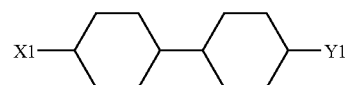

Chemical Formula 1

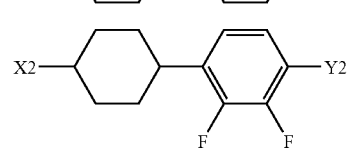

Chemical Formula 2

Chemical Formula 3

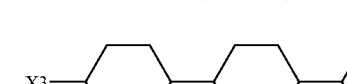

Chemical Formula 4

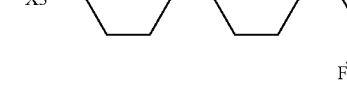

Each of X1, X2, X3 and X4 independently represents a $C_{1-10}$ alkyl group, Y1 represents a $C_{2-10}$ unsaturated group, and each of Y2, Y3 and Y4 independently represents a $C_{1-10}$ alkoxy group.

The liquid crystal composition can further include a terphenyl compound of about 5 percent by weight or less, the terphenyl compound being represented by Chemical Formula 5.

Chemical Formula 5

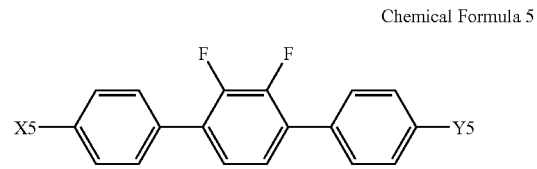

Each of X5 and Y5 independently represents a $C_{1-10}$ alkyl group.

In another aspect of the present invention, an LCD apparatus includes a thin-film transistor ("TFT") substrate, an opposing substrate and a liquid crystal layer interposed between opposing surfaces of the TFT substrate and the opposing substrate. The TFT substrate includes a gate line, a data line crossing over but not electrically connected to the gate line, a TFT electrically connected to each of the gate line and the data line, and a pixel electrode electrically connected to the TFT. The opposing substrate faces the TFT substrate. The liquid crystal layer includes a liquid crystal composition including includes a bicyclohexyl compound in an amount of about 35 percent by weight to about 50 percent by weight, the bicyclohexyl compound being represented by Chemical Formula 1, a cyclohexyl phenyl compound in an amount of about 15 percent by weight to about 25 percent by weight, the cyclohexyl phenyl compound being represented by Chemical Formula 2, a bicyclohexyl phenyl compound in an amount of about 20 percent by weight to about 25 percent by weight, the bicyclohexyl phenyl compound being represented by Chemical Formula 3, and a cyclohexyl biphenyl compound in an amount of about 15 percent by weight to about 20 percent by weight, the cyclohexyl biphenyl compound being represented by Chemical Formula 4.

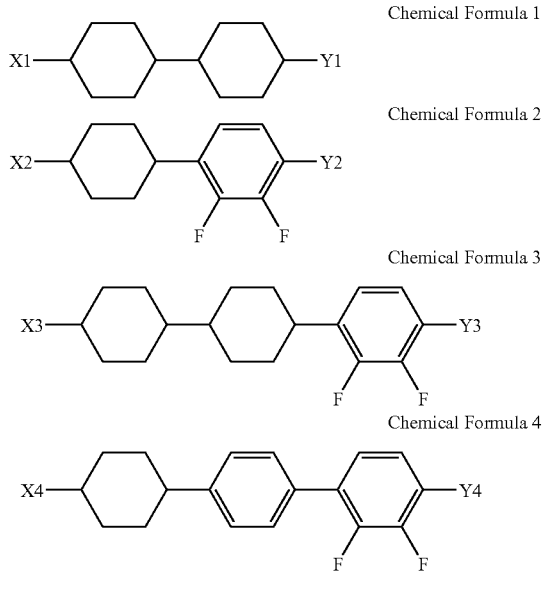

Each of X1, X2, X3 and X4 independently represents a $C_{1-10}$ alkyl group, Y1 represents a $C_{2-10}$ unsaturated group, and each of Y2, Y3 and Y4 independently represents a $C_{1-10}$ alkoxy group.

The liquid crystal composition may further include a terphenyl compound in an amount of about 5 percent by weight or less, the terphenyl compound being represented by Chemical Formula 5.

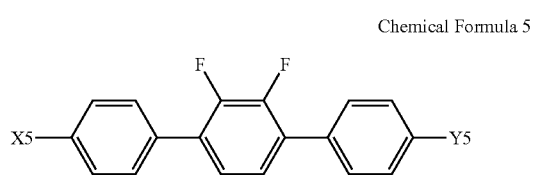

Each of X5 and Y5 in Chemical Formula 5 independently represents a $C_{1-10}$ alkyl group.

According to the above, the display quality and response time of an LCD apparatus may be improved, and manufacturing costs may be reduced.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
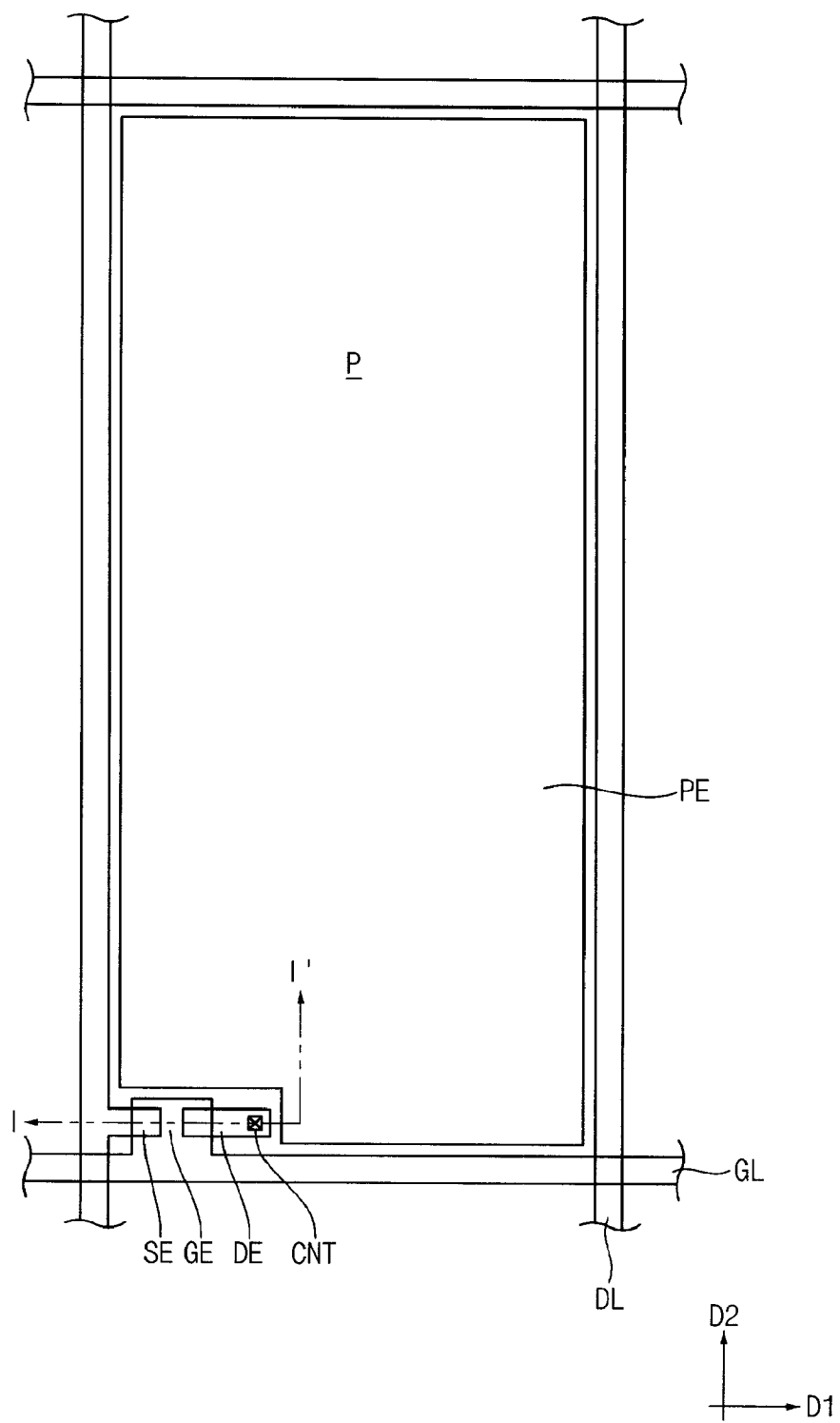
FIG. 1 is a plan view illustrating an exemplary liquid crystal display (LCD) apparatus according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Where an element is referred to as "interposed between" two elements, intervening elements or layers can be present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that, where a range of values is given, all endpoints of a given range are independently combinable.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary is skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Liquid Crystal Composition

A liquid crystal composition of the present invention includes a bicyclohexyl compound in an amount of about 35 percent by weight to about 50 percent by weight, the bicyclohexyl compound being represented by Chemical Formula 1, a cyclohexyl phenyl compound in an amount of about 15 percent by weight to about 25 percent by weight, the cyclohexyl phenyl compound being represented by Chemical Formula 2, a bicyclohexyl phenyl compound in an amount of about 20 percent by weight to about 25 percent by weight, the bicyclohexyl phenyl compound being represented by Chemical Formula 3 and a cyclohexyl biphenyl compound in an amount of about 15 percent by weight to about 20 percent by weight, the cyclohexyl biphenyl compound being represented by Chemical Formula 4.

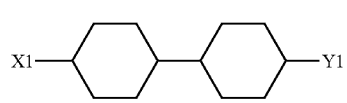

Chemical Formula 1

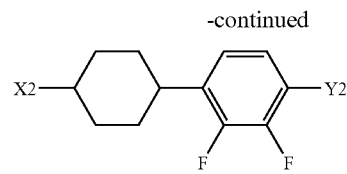

Chemical Formula 2

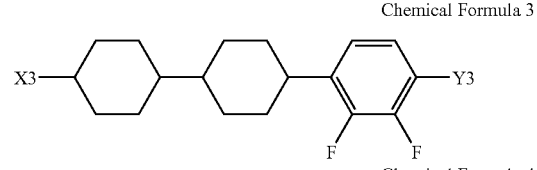

Chemical Formula 3

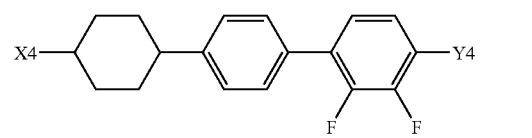

Chemical Formula 4

Each of X1, X2, X3 and X4 independently represents a $C_{1-10}$ alkyl group, Y1 represents a $C_{2-10}$ unsaturated group, and each of Y2, Y3 and Y4 independently represents a $C_{1-10}$ alkoxy group.

In an embodiment, each of X1, X2, X3 and X4 represents an alkyl group having a chain structure and five or less carbon atoms. "Chain", as used herein, means a branched or unbranched carbon chain in which the carbons are all connected to one another with no intervening non-carbon atoms. In an embodiment, the chain is an unbranched chain. It will be further understood herein that an alkyl group or alkoxy group will comprise at least one carbon atom, and that an unsaturated group will comprise at least two carbon atoms. Examples of the alkyl group having a can include a methyl group ($CH_3$—), an ethyl group ($C_2H_5$—), a propyl group ($C_3H_7$—), a butyl group ($C_4H_9$—), a pentyl group ($C_5H_{11}$—), and the like.

Y1 represents a $C_{2-10}$ unsaturated group. In an embodiment, Y1 represents an unsaturated group having a chain structure and five or less carbon atoms. Y1 has at least one double bond between carbon atoms. Examples of the unsaturated group can include an ethenyl group ($C_2H_3$—), a propenyl group ($C_3H_5$—), a propynyl or allenyl group ($C_3H_3$—), a butenyl group ($C_4H_7$—), a butenynyl group ($C_4H_3$—), a pentenyl group ($C_5H_9$—), a cyclopentenyl, pentynyl, or pentadienyl group ($C_5H_7$—), a cyclopentadienyl, pentatrienyl or pentenynyl group ($C_5H_5$—), a pentadiyne group ($C_5H_3$—), and the like.

Each of Y2, Y3 and Y4 independently represents a $C_{1-10}$ alkoxy group. An alkoxy group has carbon-carbon bonds forming a carbon chain structure (where two or more carbons are present) and a carbon-oxygen bond. In an embodiment, the carbon chain structure has five or less carbon atoms. Examples of the alkoxy group can include a methoxy group ($CH_3O$—), an ethoxy group ($C_2H_5O$—), a propoxy group ($C_3H_7O$—), a butoxy group ($C_4H_9O$—), a pentoxy group ($C_5H_{10}O$—), and the like.

The liquid crystal composition may further include a terphenyl compound of about 5 percent by weight or less, the terphenyl compound being represented by Chemical Formula 5.

Chemical Formula 5

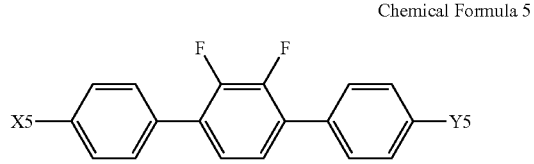

Each of X5 and Y5 independently represents a $C_{1-10}$ alkyl group. In an embodiment, each of X5 and Y5 represents an alkyl group having a chain structure and five or less carbon atoms. Examples of the alkyl group may include a methyl group ($CH_3$—), an ethyl group ($C_2H_5$—), a propyl group ($C_3H_7$—), a butyl group ($C_4H_9$—), a pentyl group ($C_5H_{11}$—), and the like.

In an embodiment, each of X1, X2, X3, X4, X5, Y1, Y2, Y3, Y4 and Y5 has five or less carbon atoms. The number of carbon atoms can be five or less to provide flexibility and polarity in the liquid crystal molecules.

The rotation viscosity of the liquid crystal composition according to an embodiment can be about 80 mPa·s to about 165 mPa·s.

The dielectric anisotropy of the liquid crystal composition according an embodiment can be about −5.8 to about −2.7.

The refractive anisotropy of the liquid crystal composition according to an embodiment can be about 0.075 to about 0.109.

Since the liquid crystal composition includes the bicyclohexyl compound, the rotation viscosity of the liquid crystal composition can be reduced and the liquid crystal composition can have improved (i.e., shorter) rising time and fall time. Accordingly, the liquid crystal composition can improve response time and display quality.

When the liquid crystal composition further includes the terphenyl compound, the liquid crystal composition may minimize changes to the dielectric anisotropy and the refractive anisotropy. As the liquid crystal composition minimizes the changes, a liquid crystal display (LCD) apparatus may have improved display quality.

Example 1

A liquid crystal composition of Example 1 was prepared according to the composition described in the following Table 1.

TABLE 1

| Structure | Content (percent by weight) |
|---|---|
| $C_3H_7$—[cyclohexyl-cyclohexyl]—$C_3H_5$ | 39 |
| $C_2H_5$—[cyclohexyl-phenyl(F,F)]—$OC_2H_5$ | 19 |

TABLE 1-continued

| Structure | Content (percent by weight) |
|---|---|
| $C_2H_5$—[cyclohexyl-cyclohexyl-phenyl(F,F)]—$OC_3H_7$ | 22.5 |
| $C_2H_5$—[cyclohexyl-phenyl-phenyl(F,F)]—$OC_3H_7$ | 18 |
| $C_2H_5$—[phenyl(F,F)-phenyl-phenyl]—$C_2H_5$ | 1.5 |

Comparative Example 1

A liquid crystal composition of Comparative Example 1 was prepared according to the composition described in the following Table 2.

TABLE 2

| Structure | Content (percent by weight) |
|---|---|
| $C_3H_7$—[cyclohexyl-phenyl]—$C_2H_5$ | 7 |
| $C_3H_7$—[cyclohexyl-phenyl]—$OC_2H_5$ | 6 |
| $C_3H_7$—[cyclohexyl-cyclohexyl]—$C_2H_5$ | 17 |
| $C_2H_5$—[cyclohexyl-phenyl(F,F)]—$OC_2H_5$ | 30 |
| $C_2H_5$—[cyclohexyl-cyclohexyl-phenyl(F,F)]—$OC_3H_7$ | 23 |
| $C_2H_5$—[cyclohexyl-cyclohexyl-phenyl(F,F)]—$C_3H_7$ | 17 |

Properties of the Working Example and the Comparative Example

Table 3 shows the properties of the liquid crystal composition according to Example 1 and the liquid crystal composition according to Comparative Example 1, the properties including refractive anisotropy, dielectric anisotropy and rotation viscosity.

The measurement conditions of the refractive anisotropy were about 589.3 nm and about 20° C.

The measurement conditions of the dielectric anisotropy were at a frequency of about 1.0 kHz and a temperature of about 20° C.

The measurement condition of the rotation viscosity was about 20° C.

TABLE 3

|  | Example 1 | Comparative Example 1 |
|---|---|---|
| Phase transition temperature (° C.) | 80 | 70 |
| Refractive anisotropy (Δn) | 0.0906 | 0.0822 |
| Dielectric anisotropy (Δε) | −3.4 | −3.8 |
| Rotation viscosity (γ1) | 102 | 133 |

Figure 3:
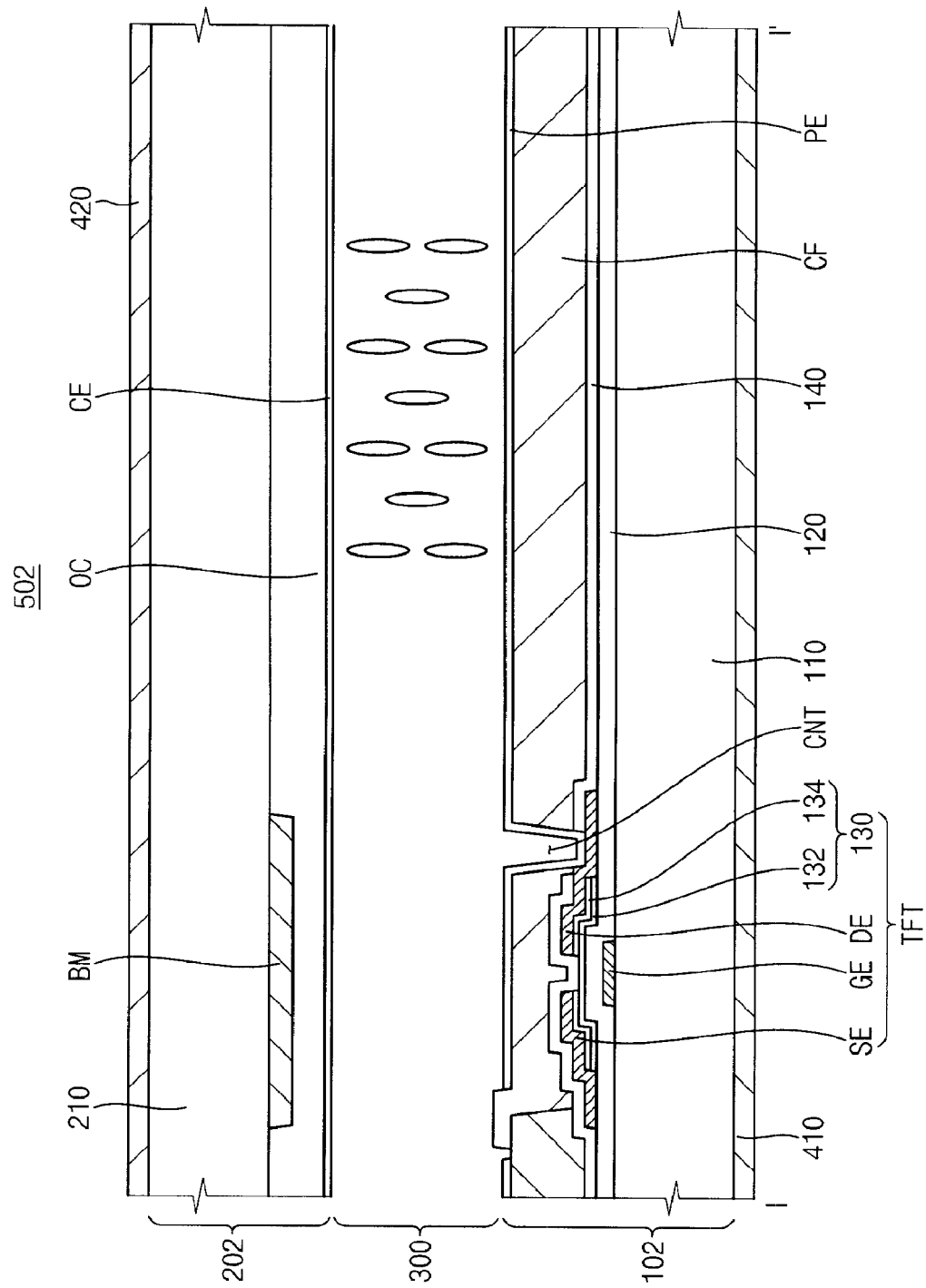
FIG. 3 is a cross-sectional view of an exemplary LCD apparatus according to another embodiment.

Referring to FIG. 3, it can be noted that the properties of the liquid crystal composition according to the Example 1 are substantially the same as the properties of the liquid crystal composition according to the Comparative Example 1. Furthermore, it can be seen that the rotation viscosity of the liquid crystal composition according to the Example 1 is lower than the rotation viscosity of the liquid crystal composition according to the Comparative Example 1.

LCD Apparatus

Figure 2:
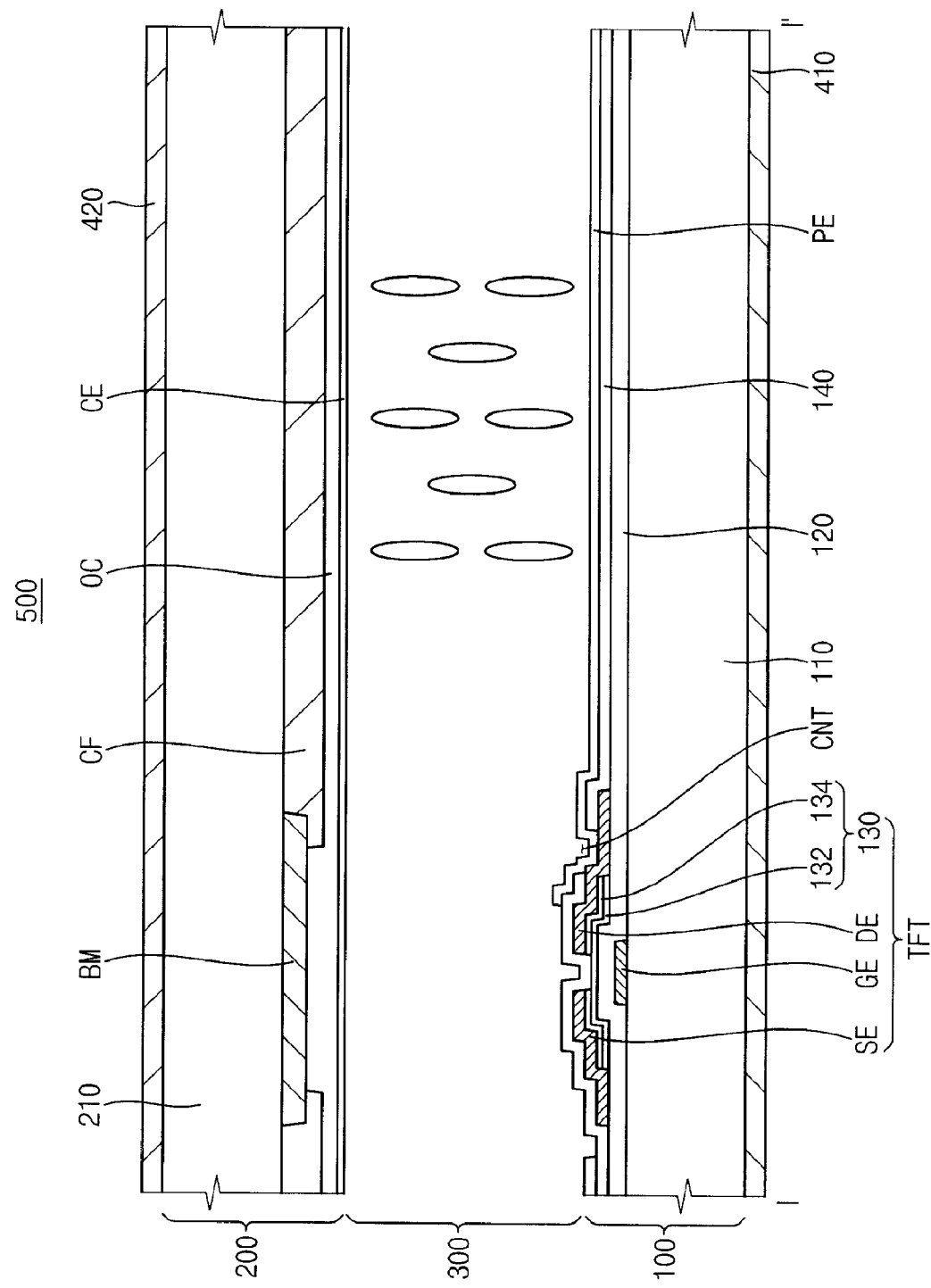
FIG. 2 is a cross-sectional view of the exemplary LCD apparatus taken along a line I-I' in FIG. 2.

FIG. 1 is a plan view illustrating an LCD apparatus according to an exemplary embodiment of the present invention. FIG. 2 is a cross-sectional view of the LCD apparatus taken along a line I-I' in FIG. 1.

Referring to FIGS. 1 and 2, an LCD apparatus 500 according to one embodiment of the present invention includes a thin-film transistor (TFT) substrate 100, an opposing substrate 200 and a liquid crystal layer 300 (see FIG. 2).

The LCD Apparatus 500 includes a TFT substrate 100 (shown in the cross-section along the line I-I' in FIG. 2; not shown in FIG. 1) which includes a gate line GL (FIG. 1) connecting to a gate electrode (GE) (FIGS. 1 and 2), a gate insulation layer (120 in FIG. 2; not shown in FIG. 1) that is disposed between and electrically separates the gate electrode GE from a data line DL (FIG. 1), a TFT (shown in the cross-section along lines I-I' in FIG. 2) electrically connected to both the gate line GL (FIG. 1) through the gate electrode GE (FIG. 2) and to the data line DL (FIG. 1) through a source electrode SE (FIG. 2), a passivation layer 140 (FIG. 2) disposed on a surface of gate insulation layer 120 opposite TFT substrate 110, and a pixel electrode PE electrically connected to the TFT.

In FIG. 1, the gate line GL is extended along a first direction D1 of the TFT substrate (100 in FIG. 2; not shown in FIG. 1). A plurality of the gate lines GL are arranged parallel to each other at intervals along a second direction D2. For example, the first direction D1 and the second direction D2 may be substantially perpendicular to each other. Referring to FIG. 2, the gate lines GL and gate electrodes GE are formed on a first base substrate 110 by patterning a gate metal layer (not shown). Examples of a material that can be used for the gate metal layer may include chromium (Cr), aluminum (Al), tantalum (Ta), molybdenum (Mo), titanium (Ti), tungsten (W), copper (Cu), silver (Ag), alloys thereof, and like conductive materials. These may be used alone or in a combination thereof. The gate metal layer may include two layers having different physical and chemical properties from each other.

In FIG. 1, the data line DL is extended along the second direction D2 of the TFT substrate (100 in FIG. 2; not shown in FIG. 1). A plurality of the data lines DL are arranged parallel to each other at intervals along the first direction D1. The data lines DL are formed on a surface of the gate insulation layer 120 opposite the first base substrate 110 by patterning a source metal layer (i.e., a metal layer from which the data lines and source electrodes are patterned). Examples of a material that can be used for the source metal layer can include chromium (Cr), aluminum (Al), tantalum (Ta), molybdenum (Mo), titanium (Ti), tungsten (W), copper (Cu), silver (Ag), alloys thereof, and the like. These may be used alone or in a combination thereof. The source metal layer may include two adjacent layers having different physical and chemical properties from each other.

In FIG. 1, the first base substrate 110 (see FIG. 2; not shown in FIG. 1) includes a pixel area P. The pixel area P may be substantially defined as a region of the first base substrate bounded by the gate lines GL and the data lines DL. For example, the pixel area P may have a rectangular shape when viewed from a plan view. Here, the gate lines GL may define a short side of the pixel area P and the data lines GL may define a long side of the pixel area P.

In the figures, the TFT is shown in plan view (FIG. 1) and in cross section along the line I-I' (FIG. 2) to include a gate electrode GE, a semiconductor pattern 130 (shown in FIG. 2, not shown in FIG. 1), a source electrode SE and a drain electrode DE.

In FIG. 1, the gate electrode GE is connected to the gate line GL. In FIG. 2, the gate electrode GE is formed on a surface of the first base substrate 110 by patterning the gate metal layer (not shown) as described above. The semiconductor pattern 130 is formed on the first base substrate 110 having the gate lines GL and the gate electrode GE. The semiconductor pattern 130 includes a semiconductor layer 132 and an ohmic contact layer 134. The ohmic contact layer 134 is formed on a surface of the semiconductor layer 132 opposite the gate insulation layer 120. For example, the semiconductor layer 132 may include amorphous silicon (a-Si) and the ohmic contact layer 134 may include n$^+$ amorphous silicon (n$^+$ a-Si) that is formed by implanting n$^+$ impurities into amorphous silicon at a high concentration. In FIG. 1, the source electrode SE is connected to the data line DL. In FIG. 2, the source electrode SE is formed on a surface of the gate insulator layer 120 opposite the first base substrate 110 by patterning the source metal layer (not shown) as described above. The drain electrode DE is spaced apart (i.e., is separated) from the source electrode SE. The source electrode SE is disposed on one edge portion (i.e., on one side of a surface) of the semiconductor pattern 130. The drain electrode DE is disposed on another edge portion (i.e., on one side of a surface) of the semiconductor pattern 130. The source electrode SE and the drain electrode DE each make contact with a surface of the ohmic contact layer 134.

In FIG. 2, the gate insulation layer 120 is formed on a surface of the first base substrate 110 to cover the gate lines GL (not shown) and the gate electrode GE. The data lines DL, the source electrode SE and the drain electrode DE are formed on the insulation layer 120. Examples of a material that may be used for the gate insulation layer 120 may include silicon nitride, silicon oxide, and the like.

Also in FIG. 2, the passivation layer 140 is formed on a surface the gate insulation layer 120 opposite the first base substrate 110 to cover the data lines DL (not shown in FIG. 2), the source electrode SE, the drain electrode DE and the gate insulation layer 120 of the pixel area P (FIG. 1; not shown in FIG. 2). The passivation layer 140 has a contact hole CNT. A portion of the drain electrode DE is exposed by the contact hole CNT. The passivation layer 140 can comprise an organic material or an inorganic material.

In some exemplary embodiments, the TFT substrate 100 can further include an organic layer (not shown in FIG. 2). The organic layer can include an organic material such as an acrylic resin, or the like. The organic layer may flatten a surface of the TFT substrate 100.

On the first base substrate 110, the pixel electrode PE is formed on a surface of the passivation layer 140 opposite the gate insulation layer 120. The pixel electrode PE makes contact with the drain electrode DE by extending through the contact hole CNT. The pixel electrode PE can include a transparent, conductive material. Exemplary transparent, conductive materials can include indium tin oxide ("ITO"), indium zinc oxide ("IZO"), and the like.

Also in FIG. 2, the opposing substrate 200 includes a second substrate 210, a light-blocking pattern BM, a color filter CF, an overcoating layer OC, and a common electrode CE.

In FIG. 2, the light-blocking pattern BM is formed on a surface of the second base substrate 210. The light-blocking pattern BM as formed corresponds to an area in which the gate lines GL, the data lines DL and the TFT are formed on the first base substrate 110, where opposing substrate 200 and TFT substrate 100 when disposed over one another cause light-blocking pattern BM and TFT to align. The light-blocking pattern BM may include an organic material or a metal.

Also in FIG. 2, the color filter CF is formed on the pixel area P (FIG. 1; not shown in FIG. 2) to face corresponding pixel electrode PE. The color filter CF can overlap a portion of the light-blocking pattern BM. An exemplary, color filter CF can include an organic material having a pigment or a dye, representing red color, green color, blue color, and the like.

The overcoating layer OC is formed on a surface of the color filter CF opposite the second base substrate 210 to cover the light-blocking pattern BM and the color filter CF. The overcoating layer OC can flatten (i.e., can planarize) the contacted surface of the opposing substrate 200 by filling in the recessed regions (such as that over light blocking pattern BM) to provide a level, uniform surface. The overcoating layer OC can comprise an organic material such as acrylic resin, and the like.

The common electrode CE is formed on a surface of the overcoating layer OC opposite the second base substrate 210, to cover the overcoating layer OC. The common electrode CE can include a transparent and conductive material. Examples of the transparent, conductive material can include indium tin oxide (ITO), indium zinc oxide (IZO), and the like.

The liquid crystal layer 300 is disposed in a space between opposing surfaces of the TFT substrate 100 and the opposing substrate 200. The liquid crystal layer 300 includes a liquid crystal composition comprising liquid crystal molecules. The liquid crystal molecules are interposed between the pixel electrode PE surface of the TFT substrate 100 and the common electrode CE surface of the opposing substrate 200. An apparatus having the TFT substrate 100 and the opposing substrate 200 can display a black image when an electric field is not formed between the pixel electrode PE and the common electrode CE. When the electric field is not formed in the apparatus, the long axis of the liquid crystal molecules can be vertically interposed between the TFT substrate 100 and the opposing substrate 200. The apparatus can display a white image when the electric field is formed between the pixel electrode PE and the common electrode CE. When the electric field is formed in the apparatus, the long axis of the liquid crystal molecule may be parallel with the TFT substrate 100 and the opposing substrate 200.

The liquid crystal composition comprises a bicyclohexyl compound being represented by Chemical Formula 1, a cyclohexyl phenyl compound being represented by Chemical Formula 2, a bicyclohexyl phenyl compound being represented by Chemical Formula 3 and a cyclohexyl biphenyl compound being represented by Chemical Formula 4.

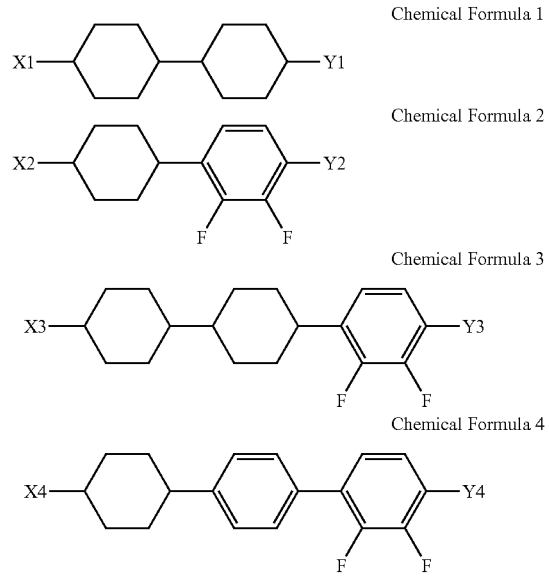

Each of X1, X2, X3 and X4 in Chemical Formulas 1-4 independently represents an alkyl group having, in an embodiment, a chain structure and five or less carbon atoms. Examples of the alkyl group may include a methyl group ($CH_3$—), an ethyl group ($C_2H_5$—), a propyl group ($C_3H_7$—), a butyl group ($C_4H_9$—), a pentyl group ($C_5H_{11}$—), and the like. Y1 represents a $C_{2-10}$ unsaturated group. In an embodiment, Y1 represents an unsaturated group having a chain structure and five or less carbon atoms. Y1 has at least one double bond between carbon atoms. Examples of the unsaturated group may include an ethenyl group ($C_2H_3$—), a propenyl group ($C_3H_5$—), a propynyl or allenyl group ($C_3H_3$—), a butenyl group ($C_4H_7$—), a butenynyl group ($C_4H_3$—), a pentenyl group ($C_5H_9$—), a cyclopentenyl, pentynyl, or pentadienyl group ($C_5H_7$—), a cyclopentadienyl, pentatrienyl, or pentenynyl group ($C_5H_5$—), a pentadiyne group ($C_5H_3$—), and the like. Each of Y2, Y3 and Y4 independently represents a $C_{1-10}$ alkoxy group. An alkoxy group has carbon-carbon bonds forming a carbon chain structure (where two or more carbons are present) and a carbon-oxygen bond. In an embodiment, the carbon chain structure has five or less carbon atoms. Examples of the alkoxy group include a methoxy group ($CH_3O$—), an ethoxy group ($C_2H_5O$—), a propoxy group ($C_3H_7O$—), a butoxy group ($C_4H_9O$—), a pentoxy group ($C_5H_{10}O$—), and the like.

In an embodiment, the liquid crystal composition can include the bicyclohexyl compound in an amount of about 35 percent by weight to about 50 percent by weight, the cyclohexyl phenyl compound in an amount of about 15 percent by weight to about 25 percent by weight, the bicyclohexyl phenyl compound in an amount of about 20 percent by weight to about 25 percent by weight and the cyclohexyl biphenyl compound in an amount of about 15 percent by weight to about 20 percent by weight, each based on the total amount of the liquid crystal composition.

In exemplary embodiments, the liquid crystal composition further includes a terphenyl compound being represented by Chemical Formula 5. Each of X5 and Y5 independently represents a $C_{1-10}$ alkyl group.

Chemical Formula 5

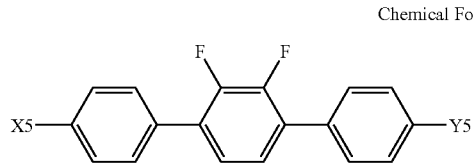

In an embodiment, each of X5 and Y5 represents an alkyl group having a chain structure and five or less carbon atoms. Examples of the alkyl group may include a methyl group ($CH_3$—), an ethyl group ($C_2H_5$—), a propyl group ($C_3H_7$—), a butyl group ($C_4H_9$—), a pentyl group ($C_5H_{11}$—), and the like. In an embodiment, the liquid crystal composition can further include the terphenyl compound in an amount of about 5 percent by weight or less. A rotation viscosity of the liquid crystal composition is, in an embodiment, about 80 mPa·s to about 165 mPa·s.

A dielectric anisotropy of the liquid crystal composition according to an embodiment is about −5.8 to about −2.7. A refractive anisotropy of the liquid crystal composition according to an embodiment is about 0.075 to about 0.109.

The LCD apparatus 500 further includes a first polarizer 410 disposed on a surface of the first base substrate 110 opposite the gate insulating layer 120, and a second polarizer 420 disposed on a surface second base substrate 210, such that the first polarizer 410 and second polarizer 420 are found on the outermost surfaces of the LCD apparatus 500. The first polarizer 410 has a first axis direction of polarized light, and the second polarizer 420 has a second axis direction of polarized light. The first axis direction of polarized light for the first polarizer 410 is, in an embodiment, substantially perpendicular to the second axis direction of polarized light for the second polarizer 420.

FIG. 3 is a cross-sectional view of an LCD apparatus according to another embodiment.

Components of the LCD apparatus shown in FIG. 3 except for the color filter are substantially the same as or similar to those shown in FIG. 2, wherein like features in FIG. 2 and FIG. 3 that repeat in these figures are numbered and labeled alike. Thus, any repetitive explanation will be omitted.

Referring to FIG. 3, an LCD apparatus 502 according to another embodiment of the present invention includes a TFT substrate 102, an opposing substrate 202 and a liquid crystal layer 300.

The TFT substrate 102 includes a first base substrate 110, a gate insulation layer 120 disposed on a surface of the first base substrate 110, a TFT formed on a surface of the first base substrate 110, a passivation layer 140 disposed on a surface of the gate insulation layer 120 opposite the first base substrate 110, a color filter CF disposed on a surface of the passivation layer 140 opposite gate insulation layer 120, and a pixel electrode PE disposed on a surface of the color filter CF opposite the passivation layer 140. The opposing substrate 202 includes a second base substrate 210, a light-blocking pattern BM disposed on a surface of the second base substrate 210, an overcoating layer OC disposed on a surface of second base substrate 210 and overcoating the light-blocking pattern BM, and a common electrode CE disposed on a surface of the overcoating layer OC opposite second base substrate 210.

In FIG. 3, the color filter CF is disposed on the passivation layer 140 of a pixel area P (not shown in FIG. 3). The color filter CF is formed on the first base substrate 110 to cover the passivation layer 140. The color filter CF can flatten (i.e., planarize) the surface of the TFT substrate 102 to form a uniform, planar surface. The color filter CF may represent a red color, green color, blue color, and the like.

The pixel electrode PE is formed to cover the color filter CF which is disposed on the sequentially layered passivation layer 140, gate insulation layer 120 which are disposed on the first base substrate 110. The pixel electrode PE may be disposed on the color filter CF and in at least partial contact with the color filter CF. In some exemplary embodiments, the apparatus 500 can further include a capping layer (not shown). The capping layer can be formed on the first base substrate 110 to cover the color filter CF. The pixel electrode PE can be formed on the capping layer. The capping layer can comprise an organic material or an inorganic material.

Figure 4:
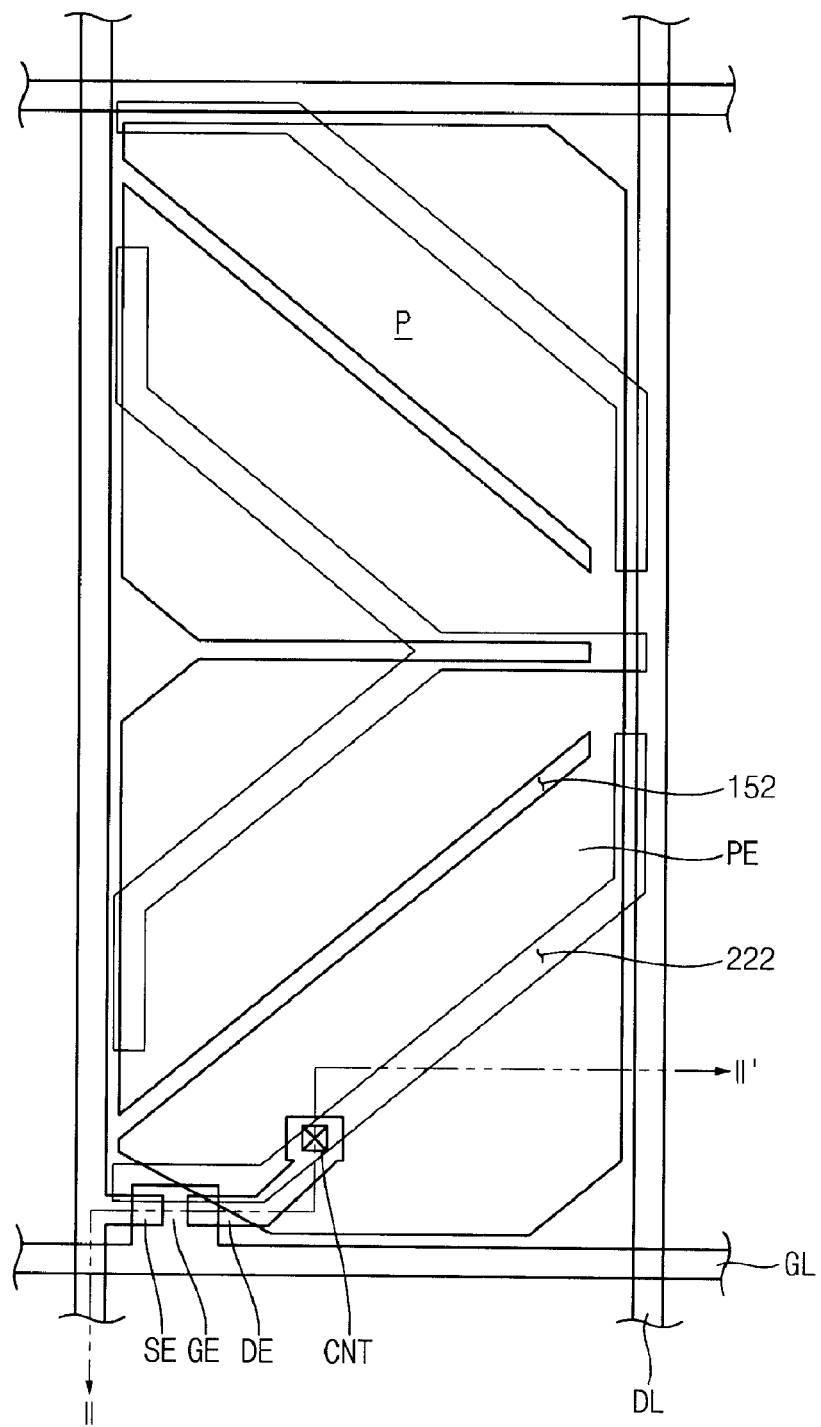
FIG. 4 is a plan view illustrating an exemplary LCD apparatus according to still another embodiment.
Figure 5:
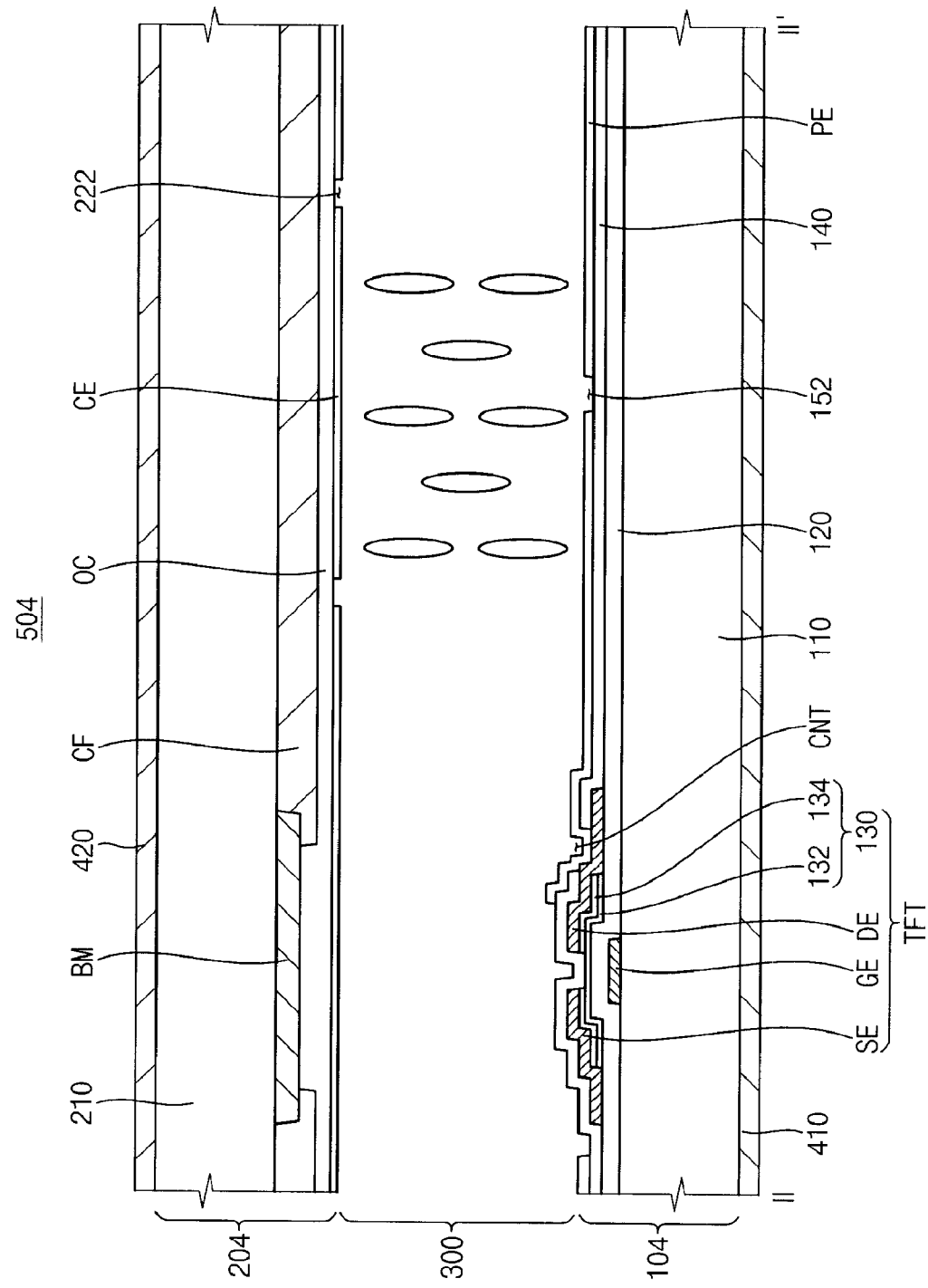
FIG. 5 is a cross-sectional view of the exemplary LCD apparatus taken along a line II-II' in FIG. 4.

FIG. 4 is a plan view illustrating an LCD apparatus according to still another embodiment of the present invention. FIG. 5 is a cross-sectional view of the LCD apparatus taken along a line II-II' in FIG. 4.

Components of the LCD apparatus shown in FIGS. 4 and 5 except for the pixel electrode and the common electrode are substantially the same as or similar to those shown in FIGS. 1 and 2, wherein like features in FIGS. 1 and 2, and in corresponding FIGS. 4 and 5, that repeat in these figures are numbered and labeled alike. Thus, any repetitive explanation will be omitted.

Referring to FIGS. 4 and 5, an LCD apparatus 504 according to an exemplary embodiment includes a TFT substrate 104 (FIG. 5) having a pixel electrode PE (FIG. 4; not shown in FIG. 5), an opposing substrate 204 (FIG. 5) having a common electrode CE (FIG. 5) and a liquid crystal layer 300 (FIG. 5).

In FIG. 4, the pixel electrode PE of the TFT substrate 104 has a first domain partition portion 152. The first domain partition portion 152 can be an opening portion of the pixel electrode PE, a protrusion portion (not shown), a depressed portion (not shown), or the like. For example, the shape of the opening portion may be a V-shape. When the first domain partition portion is a protrusion portion, the protrusion portion can comprise an organic material or an inorganic material. The protrusion portion can be disposed on or under the pixel electrode PE.

In FIG. 5, the common electrode CE of the opposing substrate 204 includes a second domain partition portion 222 (FIG. 4). The second domain partition portion 222 can be one of the following (not shown): an opening portion (e.g., a gap exposing the underlying layer) of the common electrode CE, a protrusion portion (e.g., a protruding portion of the underlying layer), a depressed portion (e.g., a recessed portion of the underlying layer), or the like. When the second domain partition portion is the protrusion portion, the protrusion portion can comprise an organic material or an inorganic material. The protrusion portion may be disposed on or under the common electrode CE.

In FIG. 4, the first domain partition portion 152 and the second domain partition portion 222 divide a pixel area P into a plurality of domains. The pixel area P can be an area in which the pixel electrode PE is formed. The first domain partition portion 152 and the second domain partition portion 222 can control the inclination direction of the molecules when an electric field is formed between the pixel electrode PE and the common electrode CE. The first domain partition portion 152 can be disposed between adjacent second domain partition portions 222 when viewed from a plan view (FIG. 4). The first domain partition portion 152 and the second domain partition portion 222 may have various shapes. Each of the first domain partition portion 152 and the second domain partition portion 222 can be formed on various surface areas of the first base substrate 110 or the second base substrate 210, respectively.

According to the embodiments disclosed herein of the liquid crystal composition and the LCD apparatus, a rotation viscosity, upon which the response time of the LCD apparatus depends, can be improved. Thus, the LCD apparatus can improve display quality. Also, deterioration in the display quality of the LCD apparatus can be prevented through minimizing brightness changes, by in turn minimizing changes to the properties of the liquid crystal composition, except for the rotation viscosity of the liquid crystal composition.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A liquid crystal composition comprising:
   a bicyclohexyl compound in an amount of about 35 percent by weight to about 50 percent by weight, the bicyclohexyl compound represented by Chemical Formula 1, where including the bicyclohexyl compound reduces a rotation viscosity of the liquid crystal composition;
   a cyclohexyl phenyl compound in an amount of about 15 percent by weight to about 25 percent by weight, the cyclohexyl phenyl compound being represented by Chemical Formula 2;
   a bicyclohexyl phenyl compound in an amount of about 20 percent by weight to about 25 percent by weight, the bicyclohexyl phenyl compound being represented by Chemical Formula 3; and
   a cyclohexyl biphenyl compound in an amount of about 15 percent by weight to about 20 percent by weight, the cyclohexyl biphenyl compound being represented by Chemical Formula 4,

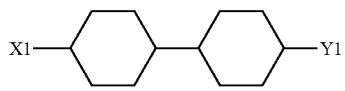

Chemical Formula 1

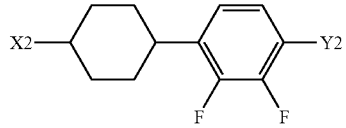

Chemical Formula 2

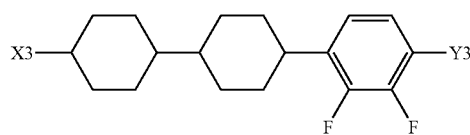

Chemical Formula 3

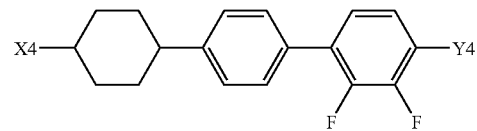

Chemical Formula 4 wherein each of X1, X2, X3 and X4 independently represents a $C_{1-10}$ alkyl group, Y1 represents a $C_{2-10}$ unsaturated group, and each of Y2, Y3 and Y4 independently represents a $C_{1-10}$ alkoxy group.

2. The liquid crystal composition of claim 1, wherein a rotation viscosity of the liquid crystal composition is from about 80 mPa·s to about 165 mPa·s.

3. The liquid crystal composition of claim 2, wherein each of X1, X2, X3, X4, Y1, Y2, Y3 and Y4 has a chain structure and five or less carbon atoms.

4. The liquid crystal composition of claim 3, further comprising a terphenyl compound in an amount of about 5 percent by weight or less, the terphenyl compound being represented by Chemical Formula 5,

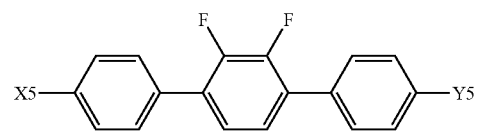

Chemical Formula 5 wherein each of X5 and Y5 independently represents a $C_{1-10}$ alkyl group.

5. The liquid crystal composition of claim 4, wherein each of X5 and Y5 has a chain structure and five or less carbon atoms.

6. The liquid crystal composition of claim 4, wherein a dielectric anisotropy of the liquid crystal composition is from about −5.8 F/m to about −2.7 F/m.

7. The liquid crystal composition of claim 6, wherein a refractive anisotropy of the liquid crystal composition is from about 0.075 to about 0.109.

8. A liquid crystal display (LCD) apparatus comprising:
   a thin-film transistor (TFT) substrate comprising a gate line, a data line crossing over but not electrically connected to the gate line, a TFT connected to each of the gate line and the data line, and a pixel electrode electrically connected to the TFT;
   an opposing substrate opposing the TFT substrate; and
   a liquid crystal layer comprising a liquid crystal composition and being interposed between opposing surfaces of the TFT substrate and the opposing substrate, the liquid crystal composition comprising:
      a bicyclohexyl compound in an amount of about 35 percent by weight to about 50 percent by weight, the bicyclohexyl compound being represented by Chemical Formula 1, where including the bicyclohexyl compound reduces a rotation viscosity of the liquid crystal composition;
      a cyclohexyl phenyl compound in an amount of about 15 percent by weight to about 25 percent by weight, the cyclohexyl phenyl compound being represented by Chemical Formula 2;

a bicyclohexyl phenyl compound in an amount of about 20 percent by weight to about 25 percent by weight, the bicyclohexyl phenyl compound being represented by Chemical Formula 3; and a cyclohexyl biphenyl compound in an amount of about 15 percent by weight to about 20 percent by weight, the cyclohexyl biphenyl compound being represented by Chemical Formula 4,

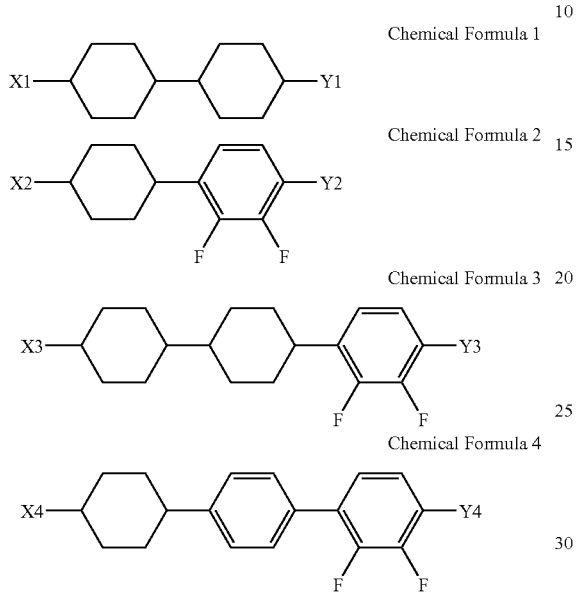

Chemical Formula 1

Chemical Formula 2

Chemical Formula 3

Chemical Formula 4 wherein each of X1, X2, X3 and X4 independently represents a $C_{1-10}$ alkyl group, Y1 represents a $C_{2-10}$ unsaturated group, and each of Y2, Y3 and Y4 independently represents a $C_{1-10}$ alkoxy group.

9. The LCD apparatus of claim 8, wherein a rotation viscosity of the liquid crystal composition is from about 80 mPa·s to about 165 mPa·s.

10. The LCD apparatus of claim 9, wherein the liquid crystal composition further comprises a terphenyl compound in an amount of about 5 percent by weight or less, the terphenyl compound being represented by Chemical Formula 5,

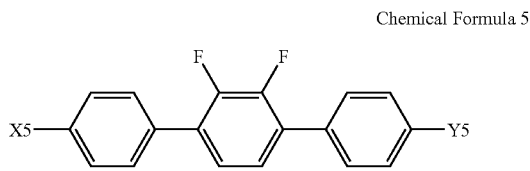

Chemical Formula 5 wherein each of X5 and Y5 independently represents a $C_{1-10}$ alkyl group.

11. The LCD apparatus of claim 10, wherein each of X1, X2, X3, X4, X5, Y1, Y2, Y3, Y4 and Y5 has a chain structure and five or less carbon atoms.

12. The LCD apparatus of claim 11, wherein the pixel electrode includes first domain partition portions dividing an area in which the pixel electrode is formed, into a plurality of domains.

13. The LCD apparatus of claim 12, wherein the opposing substrate has a common electrode including a plurality of second domain partition portion, and each of the second domain partition portions overlaps an area between the first domain partition portions adjacent to each other.

14. The LCD apparatus of claim 11, wherein the TFT substrate further comprises a color filter formed in the area in which the pixel electrode is formed.

* * * * *